US012103107B2

(12) United States Patent
McCarthy et al.

(10) Patent No.: US 12,103,107 B2
(45) Date of Patent: Oct. 1, 2024

(54) SYSTEM AND METHODS FOR COMPENSATING FOR CALIBRATION PLATE IRREGULARITIES IN ADDITIVE MANUFACTURING SYSTEMS

(71) Applicant: General Electric Company, Schenectady, NY (US)

(72) Inventors: Brian Scott McCarthy, Schenectady, NY (US); Eric Edward Halla, West Chester, OH (US); Thomas Charles Adcock, Glenville, NY (US); Michael Evans Graham, Slingerlands, NY (US); Andrea Marie Schmitz, Niskayuna, NY (US); Mark Samuel Bailey, Fairfield, OH (US)

(73) Assignee: General Electric Company, Cincinnati, OH (US)

( * ) Notice: Subject to any disclaimer, the term of this patent is extended or adjusted under 35 U.S.C. 154(b) by 514 days.

(21) Appl. No.: 16/515,470

(22) Filed: Jul. 18, 2019

(65) Prior Publication Data
US 2021/0016394 A1 Jan. 21, 2021

(51) Int. Cl.
*B23K 26/342* (2014.01)
*B23K 26/042* (2014.01)
(Continued)

(52) U.S. Cl.
CPC .......... *B23K 26/342* (2015.10); *B23K 26/042* (2015.10); *B23K 26/0884* (2013.01);
(Continued)

(58) Field of Classification Search
CPC .......................... B23K 26/342; B23K 24/042; B23K 26/0884; B23K 26/702; B23K 26/705; B33Y 30/00; B33Y 10/00; B33Y 50/02
(Continued)

(56) References Cited

U.S. PATENT DOCUMENTS 5,968,691 A * 10/1999 Yoshioka .............. G03F 7/3021
430/311
8,666,142 B2 3/2014 Shkolnik et al.
(Continued)

OTHER PUBLICATIONS

Blaudeck et al., "Simplified Large-Area Manufacturing of Organic Electrochemical Transistors Combining Printing and a Self-Aligning Laser Ablation Step", Advanced Functional Materials, vol. 22, Issue: 04, pp. 2939-2948, Jul. 24, 2012.
(Continued)

*Primary Examiner* — Helena Kosanovic
*Assistant Examiner* — Yeong Juen Thong
(74) *Attorney, Agent, or Firm* — Dority & Manning, P.A.

(57) ABSTRACT

A method of aligning at least one laser beam of an additive manufacturing arrangement. The method includes measuring a surface of the calibration plate at a plurality of measurement points using the coordinate measuring machine. The method further includes generating a correction field based on the plurality of measurement points using the coordinate measuring machine. The method further includes writing at least one fiducial mark on the surface of the calibration plate using the at least one laser beam. The method further includes generating calibration data for the surface of the calibration plate using the calibration system. The method also includes aligning the laser beam within the additive manufacturing system based on the calibration data and the correction field using the computing device by comparing a position of the fiducial mark from the calibration data with the correction field to determine a corrected position of the laser beam.

14 Claims, 8 Drawing Sheets

(51) Int. Cl.
  *B23K 26/08* (2014.01)
  *B23K 26/70* (2014.01)
  *B33Y 10/00* (2015.01)
  *B33Y 30/00* (2015.01)
  *B33Y 50/02* (2015.01)

(52) U.S. Cl.
  CPC ............ *B23K 26/702* (2015.10); *B33Y 30/00* (2014.12); *B33Y 50/02* (2014.12); *B33Y 10/00* (2014.12)

(58) Field of Classification Search
  USPC .................................. 219/76.1, 136, 121.68
  See application file for complete search history.

(56) References Cited

U.S. PATENT DOCUMENTS

| | | | | |
|---|---|---|---|---|
| 2004/0144760 | A1* | 7/2004 | Cahill | H01L 21/67282 257/E23.179 |
| 2010/0176539 | A1* | 7/2010 | Higashi | B22F 10/20 264/497 |
| 2016/0082668 | A1 | 3/2016 | Perret et al. | |
| 2016/0339542 | A1* | 11/2016 | Paetz | B29C 64/153 |
| 2018/0126629 | A1 | 5/2018 | Staal et al. | |
| 2018/0185963 | A1* | 7/2018 | Ostroverkhov | B23K 26/123 |
| 2018/0193956 | A1 | 7/2018 | Ostroverkhov et al. | |
| 2018/0281067 | A1 | 10/2018 | Small et al. | |
| 2018/0347969 | A1 | 12/2018 | Snelling, Jr. et al. | |
| 2021/0023622 | A1* | 1/2021 | Pieger | B22F 10/30 |

OTHER PUBLICATIONS

Scime et al., "Using machine learning to identify in-situ melt pool signatures indicative of flaw formation in a laser powder bed fusion additive manufacturing process", Additive Manufacturing, vol. 25, pp. 151-165, Jan. 2019.

* cited by examiner

SYSTEM AND METHODS FOR COMPENSATING FOR CALIBRATION PLATE IRREGULARITIES IN ADDITIVE MANUFACTURING SYSTEMS

BACKGROUND

The field of the disclosure relates generally to additive manufacturing systems, and more particularly, to systems and methods for compensating for calibration plate irregularities in additive manufacturing systems.

At least some additive manufacturing systems involve the buildup of a powdered material to make a component. These techniques can produce complex components from powder materials at a reduced cost and with improved manufacturing efficiency. At least some known additive manufacturing systems, such as DMLM systems, fabricate components using a plurality of laser devices, a build platform, a recoater, and a powder material, such as, without limitation, a powdered metal. The laser devices each generate a laser beam that melts the powder material on the build platform in and around the area where the laser beam is incident on the powder material, resulting in a melt pool. The melt pool cools into a consolidated, solid top layer of the component. Multiple portions of the component may be manufactured simultaneously using multiple lasers. As such, multiple lasers reduce manufacturing time and reduce the cost to produce the component.

The laser beams must be aligned before the start of the manufacturing process to ensure that the portions manufactured by each individual laser head are aligned throughout the manufacturing process. Typically, prior to the manufacturing process, a calibration plate is placed in the additive manufacturing system and aligned with the laser devices such that the upward face of the calibration plate is positioned in the same location where the top surface of the powder material will be within the additive manufacturing system during the manufacturing process. The laser devices then write at least one fiducial mark on the calibration plate, and the calibration plate is subsequently removed from the additive manufacturing system. A calibration system then reads the fiducial marks on the calibration plate to determine if the laser beams are aligned with each other and the calibration plate.

Current practice to ensure accurate calibration such that the top surface of the calibration plate should be as flat as possible and precisely aligned with the top surface of the powder material as it exists during the manufacturing process. However, completely flat calibration plates are expensive to manufacture to high precision and aligning the calibration plate with the position of the powder material used at a later time, on a different build plate may be relatively difficult. It is also common for the opposite faces of the calibration plate to be out of parallel which contributes to the misalignment of the top face of the calibration plate and the powder bed.

BRIEF DESCRIPTION

In one aspect, a method of aligning at least one laser beam of an additive manufacturing arrangement is provided. The additive manufacturing arrangement includes a coordinate measuring machine, a calibration system, an additive manufacturing system, and a computing device. The additive manufacturing system includes a calibration plate. The method includes positioning the calibration plate in the coordinate measuring machine. The method also includes measuring a surface of the calibration plate at a plurality of measurement points using the coordinate measuring machine. The method further includes generating a correction field based on the plurality of measurement points using the coordinate measuring machine. The method also includes positioning the calibration plate in the additive manufacturing system. The method further includes writing at least one fiducial mark on the surface of the calibration plate using the at least one laser beam. The method also includes positioning the calibration plate in the calibration system. The method further includes generating calibration data for the surface of the calibration plate using the calibration system. The method also includes aligning the at least one laser beam within the additive manufacturing system based on the calibration data and the correction field using the computing device by comparing a position of the at least one fiducial mark from the calibration data with the correction field to determine a corrected position of the at least one laser beam.

In another aspect, a method of manufacturing a component with an additive manufacturing system is provided. The additive manufacturing arrangement includes a coordinate measuring machine, a calibration system, an additive manufacturing system, and a computing device. The additive manufacturing system includes a build platform, a calibration plate, and a laser device. The method includes positioning the calibration plate in the coordinate measuring machine. The method also includes measuring a surface of the calibration plate at a plurality of measurement points using the coordinate measuring machine. The method further includes generating a correction field based on the plurality of measurement points using the coordinate measuring machine. The method also includes positioning the calibration plate in the additive manufacturing system. The method further includes writing at least one fiducial mark on the surface of the calibration plate using the at least one laser beam. The method also includes positioning the calibration plate in the calibration system. The method further includes generating calibration data for the surface of the calibration plate using the calibration system. The method also includes aligning the at least one laser beam within the additive manufacturing system based on the calibration data and the correction field using the computing device by comparing a position of the at least one fiducial mark from the calibration data with the correction field to determine a corrected position of the at least one laser beam. The method further includes positioning the build platform in the additive manufacturing system and spreading a powdered build material on the build platform. The method also includes generating at least one laser beam from the laser device and directing the laser beam onto the powdered build material.

In yet another aspect, an additive manufacturing arrangement is provided. The additive manufacturing arrangement includes an additive manufacturing system, a coordinate measuring machine, a calibration system, and a computing device. The additive manufacturing system is configured to manufacture a component and includes a calibration plate including a surface and at least one laser device. The at least one laser device is configured to generate at least one laser beam and write at least one fiducial mark on the surface of the calibration plate. The coordinate measuring machine is configured to measure the surface of the calibration plate at a plurality of measurement points and generate a correction field based on the plurality of measurement points. The calibration system is configured to generate calibration data for the surface of the calibration plate. The computing device is configured to align the at least one laser beam within the additive manufacturing system based on the calibration data and the correction field by comparing a position of the at least one fiducial mark from the calibration data with the correction field to determine a corrected position of the at least one laser beam.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of additive manufacturing systems described herein align at least one laser using a calibration plate. Specifically, the additive manufacturing system includes a calibration plate, at least one laser device generating at least one laser beam, and a coordinate measuring machine (CMM). The CMM includes a probe configured to measure the geometry of the calibration plate by measuring a plurality of measuring points on a surface of the calibration plate. The calibration plate is placed on a CMM calibration surface that corresponds to an additive manufacturing system calibration surface in the additive manufacturing system. As such, the measurements taken by the CMM correspond to a predetermined plane within the additive manufacturing system. In the exemplary embodiment, the predetermined plane is aligned with the position of a powder material within the additive manufacturing system during the manufacturing process. The calibration plate is positioned within the CMM, and the probe measures the top and bottom geometry of the calibration plate and generates a surface profile and a correction field for the calibration plate. The correction field is sent to a computing device that controls the at least one laser device, and the calibration plate is placed in the additive manufacturing system. The laser beam of the at least one laser device write at least one fiducial mark on the calibration plate, and the calibration plate is subsequently removed from the additive manufacturing system and positioned in a calibration system. The calibration system then reads the fiducial marks on the calibration plate to determine if the laser beam is aligned within the additive manufacturing system and the calibration plate, and sends the calibration data to the computing device. A build platform is then positioned within the additive manufacturing system, and a powdered material is spread on the build platform. The at least one laser device generates laser beams directed towards the powdered build material on the build platform to consolidate the powdered build material into a solid component.

The surface of the calibration plate may include irregularities which may cause the laser beam to be uncalibrated. For example, irregularities in a vertical direction may cause misalignment in a horizontal direction. More specifically, if the calibration plate is not entirely flat, or the top and bottom sides of the plate are not parallel, the irregularities in the vertical direction may cause a laser beam spot to be directed to a point which is offset from an intended point on the calibration plate. The computing device controls the at least one laser device based on the calibration data and the correction field such that the laser beams are aligned on the calibration plate and the build platform. More specifically, the computing device controls the at least one laser device such that horizontal positions of the laser beam is compensated to account for irregularities in the calibration plate. Accordingly, the calibration plate does not have to be entirely flat, or the opposing sides parallel, reducing the cost of the calibration plate. Further, the computer device can account for any misalignments between the calibration plate and the build plate within the additive manufacturing system.

Figure 1:
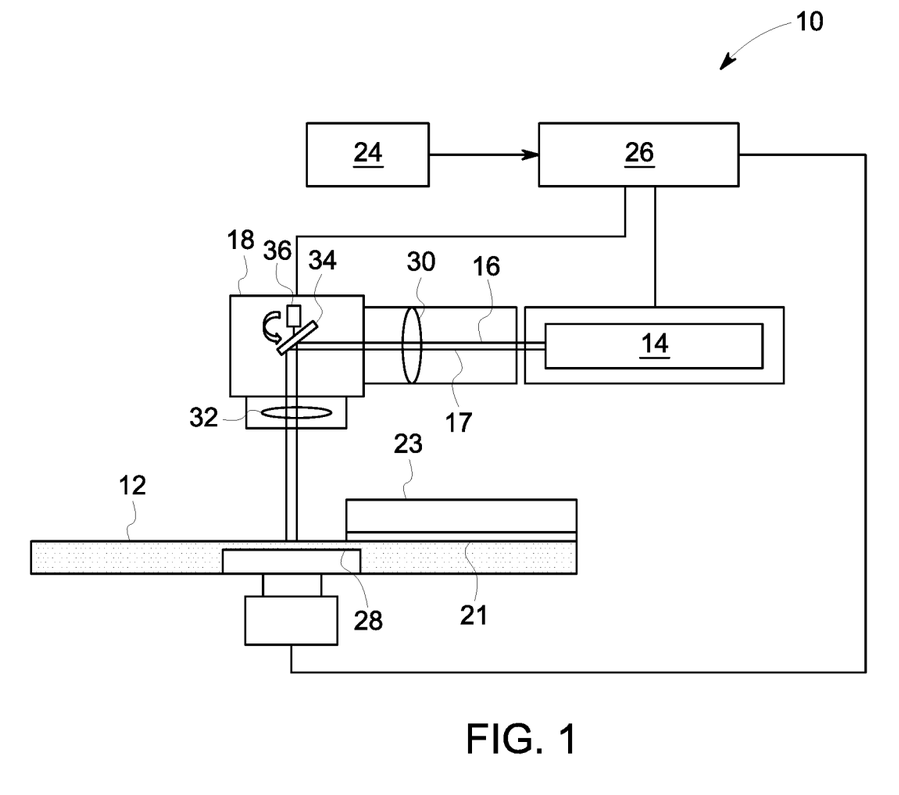
FIG. 1 is a schematic view of an exemplary additive manufacturing system shown in the form of a direct metal laser melting (DMLM) system including an exemplary build platform.
Figure 2:
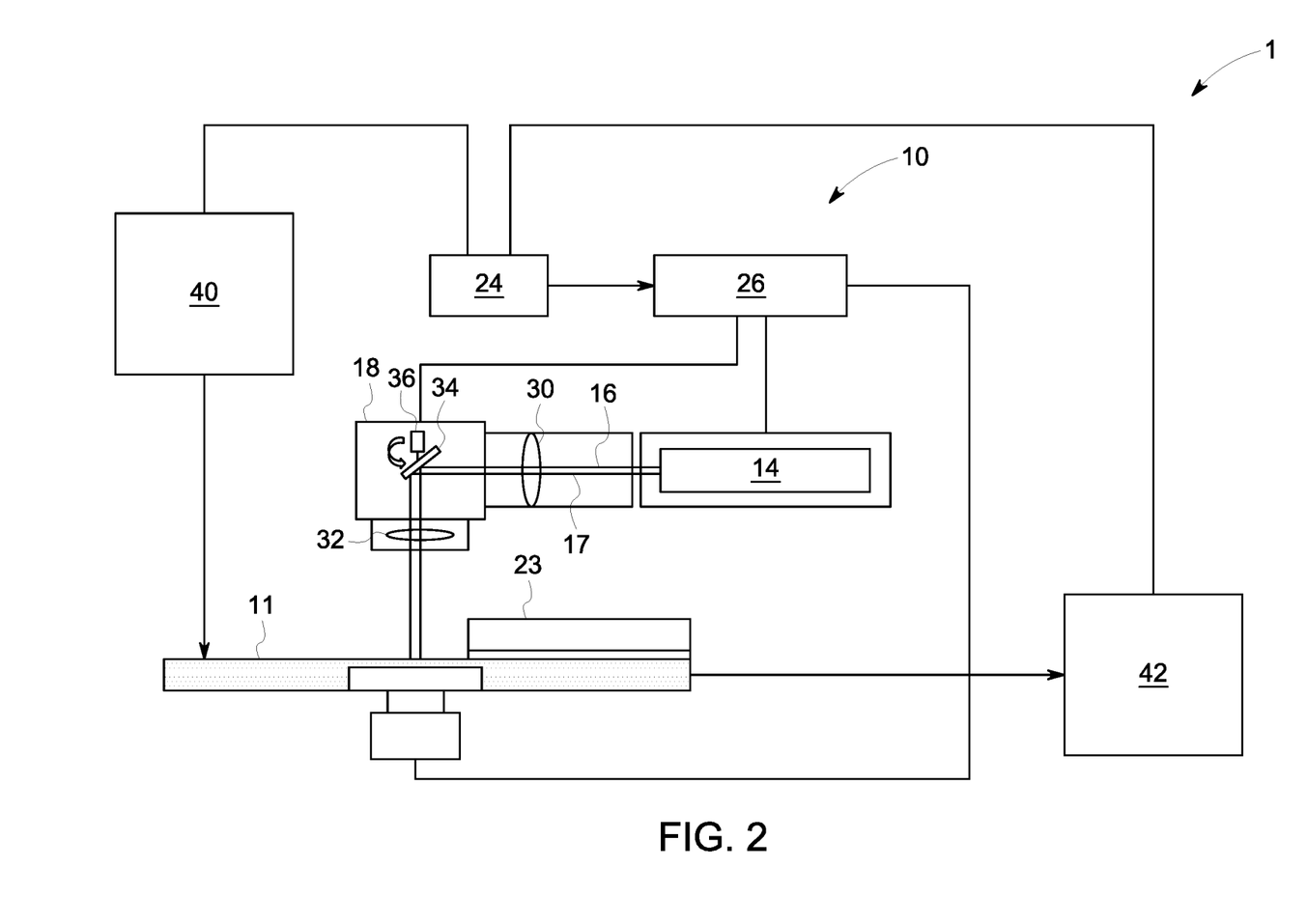
FIG. 2 is a schematic view of an exemplary additive manufacturing system shown in the form of a direct metal laser melting (DMLM) system including an exemplary calibration plate, coordinate measuring machine, and calibration system.

FIG. 1 is a schematic view of an exemplary additive manufacturing system 10 illustrated in the form of a direct metal laser melting (DMLM) system including a build platform 12. FIG. 2 is a schematic view of exemplary additive manufacturing arrangement 1 including DMLM system 10 including a calibration plate 11 instead of build platform 12. In addition to DMLM system 10, additive manufacturing arrangement 1 also includes a coordinate measuring machine (CMM) 40 and a calibration system 42.

Although the embodiments herein are described with reference to a DMLM system, this disclosure also applies to other types of additive manufacturing systems, such as selective laser sintering systems, or systems using electron beam as the consolidation energy source.

In the exemplary embodiment, as shown in FIGS. 1 and 2, DMLM system 10 includes build platform 12 or calibration plate 11, a laser device 14 configured to generate at least one laser beam 16, and a scanning device 18 configured to selectively direct laser beam 16 across build platform 12 and/or calibration plate 11. In the illustrated embodiment, laser device 14 is configured to generate at least two laser beams 16 and 17, and scanning device is configured to selectively direct laser beams 16 and 17 across build platform 12 and/or calibration plate 11. DMLM system 10 also includes a recoater 23 configured to spread a powdered build material 21 across build platform 12. DMLM system 10 also includes a computing device 24 and a controller 26 configured to control one or more components of DMLM system 10, as described in more detail herein.

As shown in FIG. 1, build platform 12 includes powdered build material 21 that is melted and re-solidified during the additive manufacturing process to build a solid, consolidated component 28. Powdered build material 21 includes materials suitable for forming such components, including, without limitation, gas atomized alloys of cobalt, iron, aluminum, titanium, nickel, and combinations thereof. In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins.

Laser device 14 is configured to generate laser beams 16 and 17 of sufficient energy to at least partially melt powdered build material 21. In the exemplary embodiment, laser device 14 is a yttrium-based solid state laser configured to emit a laser beam having a wavelength of about 1070 nanometers (nm). In other embodiments, laser device 14 includes any suitable type of laser that enables DMLM system 10 to function as described herein, such as a carbon dioxide laser. Further, although DMLM system 10 is shown and described as including a single laser device 14, DMLM system 10 may include multiple laser devices in some embodiments.

Laser device 14 is optically coupled to optical elements 30 and 32 that facilitate focusing laser beams 16 and 17 on build platform 12 and/or calibration plate 11. In the exemplary embodiment, optical elements 30 and 32 include a beam collimator 30 disposed between the laser device 14 and scanning device 18, and an F-theta lens 32 disposed between the scanning device 18 and build platform 12 and/or calibration plate 11. In other embodiments, DMLM system 10 includes any suitable type and arrangement of optical elements that provide a collimated and/or focused laser beam on build platform 12.

As shown in FIG. 1, scanning device 18 is configured to direct laser beams 16 and 17 across selective portions of build platform 12 to create solid component 28. In the exemplary embodiment, scanning device 18 is a galvanometer scanning device including a mirror 34 operatively coupled to a galvanometer-controlled motor 36 (broadly, an actuator). Motor 36 is configured to move, e.g., rotate, mirror 34 in response to signals received from controller 26, and thereby deflect laser beams 16 and 17 across selective portions of build platform 12. Mirror 34 has any suitable configuration that enables mirror 34 to deflect laser beams 16 and 17 towards build platform 12. In some embodiments, mirror 34 includes a reflective coating having a reflectance spectrum that corresponds to the wavelength of laser beams 16 and 17.

Although scanning device 18 is illustrated with a single mirror 34 and a single motor 36, scanning device 18 may include any suitable number of mirrors and motors that enable scanning device 18 to function as described herein. In one embodiment, scanning device 18 includes two mirrors and two galvanometer-controlled motors, each operatively coupled to one of the mirrors. In other embodiments, scanning device 18 includes any suitable scanning device that enables DMLM system 10 to function as described herein, such as, for example, two-dimension (2D) scan galvanometers, three-dimension (3D) scan galvanometers, and dynamic focusing galvanometers.

During operation, CMM 40 (shown in FIG. 2), calibration system 42 (shown in FIG. 2), and computing device 24 and/or controller 26 are used to align laser beam 16 and/or laser beams 16 and 17, as described herein. After alignment of laser beams 16 and 17, scanning device 18 directs laser beams 16 and 17 across selective portions of build platform 12 to create solid component 28. Specifically, laser beams 16 and 17 melt powdered build material 21, and powdered build material 21 cools into a layer of a solid, consolidated component 28. Once a layer has cooled into a portion of component 28, additional powdered build material 21 is spread over the layer to form a new layer. Accordingly, component 28 is consolidated layer by layer.

Computing device 24 includes at least one processing device (not shown in FIG. 1) and at least one memory device (not shown in FIG. 1) for executing instructions to operate DMLM system 10. Computing device 24 includes, for example, an electronic computer build file associated with a component, such as component 28. The build file includes build parameters that are used to control one or more components of DMLM system 10. Build parameters includes, without limitation, a power of laser device 14, a scan speed of scanning device 18, and a position and orientation of scanning device 18 (specifically, mirror 34). In the exemplary embodiment, computing device 24 and controller 26 are shown as separate devices. In other embodiments, computing device 24 and controller 26 are combined as a single device that operates as both computing device 24 and controller 26 as each are described herein.

Controller 26 includes any suitable controller that enables DMLM system 10 to function as described herein. In one embodiment, for example, controller 26 includes at least one processor and at least one memory device for executing instructions to control the operation of DMLM system 10 based at least partially on input from human operators. Controller 26 includes, for example, a 3D model of component 28 to be fabricated by DMLM system 10. Executable instructions executed by controller 26 facilitate controlling the power output of laser device 14, controlling a position and scan speed of scanning device 18, and controlling a position and rotation rate of build platform 12. Controller 26 is configured to control one or more components of DMLM system 10 based on build parameters associated with a build file stored, for example, within computing device 24. In the exemplary embodiment, controller 26 is configured to control scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

As shown in FIG. 2, DMLM system 10 also includes CMM 40 and calibration system 42. CMM 40 is configured to generate a surface profile 700 (shown in FIG. 7) of a surface 320 (shown in FIG. 3) of calibration plate 11 and a correction field 800 (shown in FIG. 8) of surface 320 of calibration plate 11. Surface profile 700 and correction field 800 are sent to computing device 24 and/or controller 26. DMLM system 10 is configured to write at least one fiducial mark (not shown) on surface 320 of calibration plate 11. Calibration system 42 is configured to read the fiducial mark on surface 320 of calibration plate 11 and generate calibration data that is sent to computing device 24 and/or controller 26. Computing device 24 and/or controller 26 are configured to adjust the build file to align laser beam 16 and/or laser beams 16 and 17 and maintain the alignment of laser beam 16 and/or laser beams 16 and 17 throughout the manufacturing process.

Figure 8:
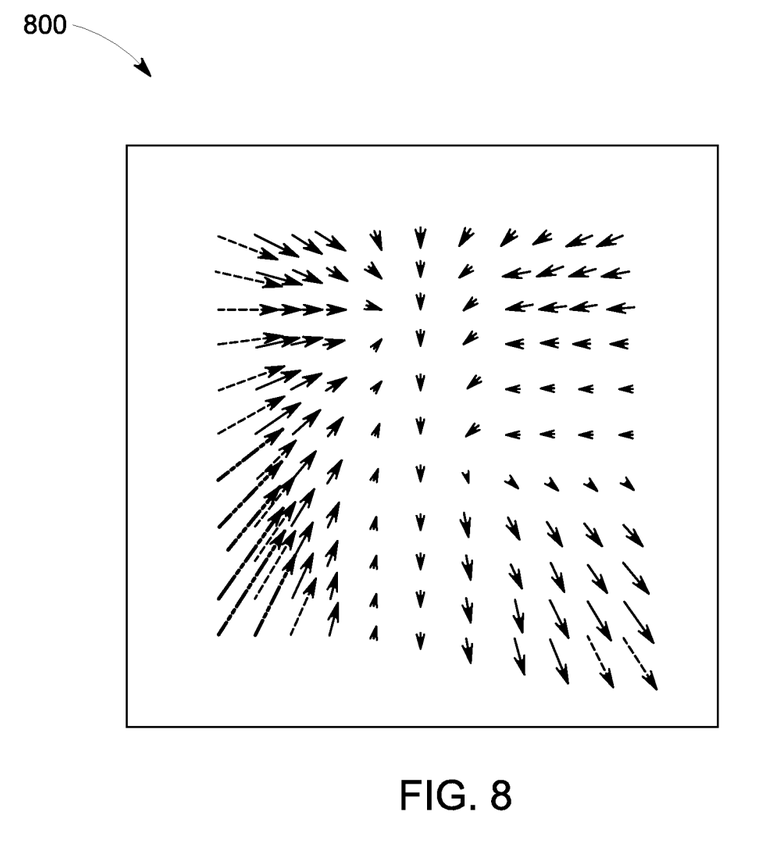
FIG. 8 is a schematic view of an exemplary correction field generated by the coordinate measuring machine shown in FIG. 2.

In the exemplary embodiment, computing device 24 and/or controller 26 are also configured to operate at least partially as a data acquisition device and to align laser beam 16 and/or laser beams 16 and 17 during fabrication of component 28. In one embodiment, for example, computing device 24 and/or controller 26 receives and processes correction field 800 from CMM 40. Computing device 24 and/or controller 26 also receives and processes calibration data from calibration system 42. Computing device 24 and/or controller 26 then align laser beam 16 and/or laser beams 16 and 17 based on the calibration data and correction field 800.

Figure 3:
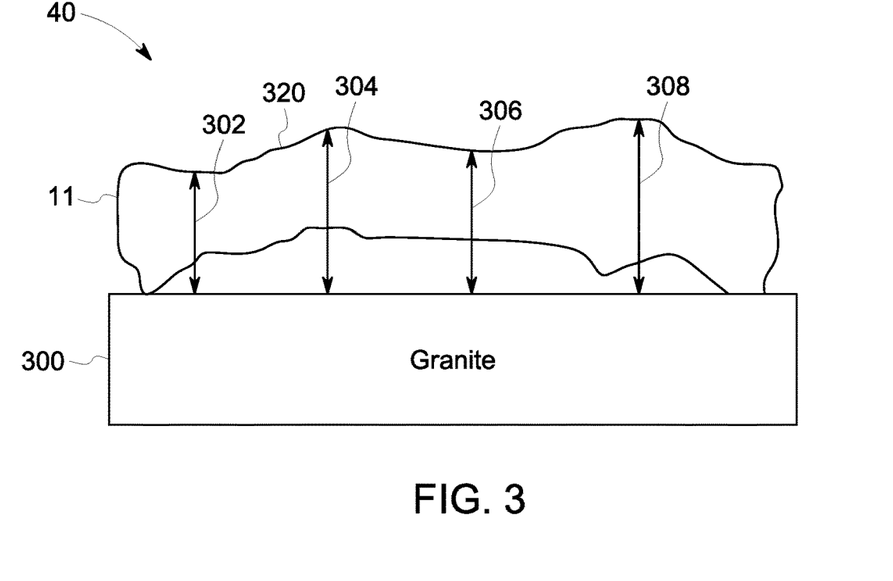
FIG. 3 is a schematic view of the calibration plate shown in FIG. 2 positioned in the coordinate measuring machine shown in FIG. 2 in a first calibration configuration.

In the exemplary embodiment, CMM 40 includes a probe (not shown) configured to measure the geometry of calibration plate 11. Specifically, the probe is configured to measure surface 320 of calibration plate 11 relative to a reference point. CMM 40 may include any device configured to measure surface 320 of calibration plate 11 that enables CMM 40 to operate as described herein, including, without limitation, optical detectors and mechanical detectors. CMM 40 may be any device that measures surface 320 of calibration plate 11 relative to the reference plane.

In the exemplary embodiment, calibration system 42 is a detection system configured to read the fiducial mark on surface 320 of calibration plate 11 and generate calibration data which is sent to computing device 24 and/or controller 26. Specifically, calibration system 42 may include an optical device, such as, but not limited to, a camera, configured to detect the fiducial marks on surface 320 of calibration plate 11. Calibration system 42 may include any device configured to read the fiducial marks on surface 320 of calibration plate 11 and generate calibration data.

Figure 7:
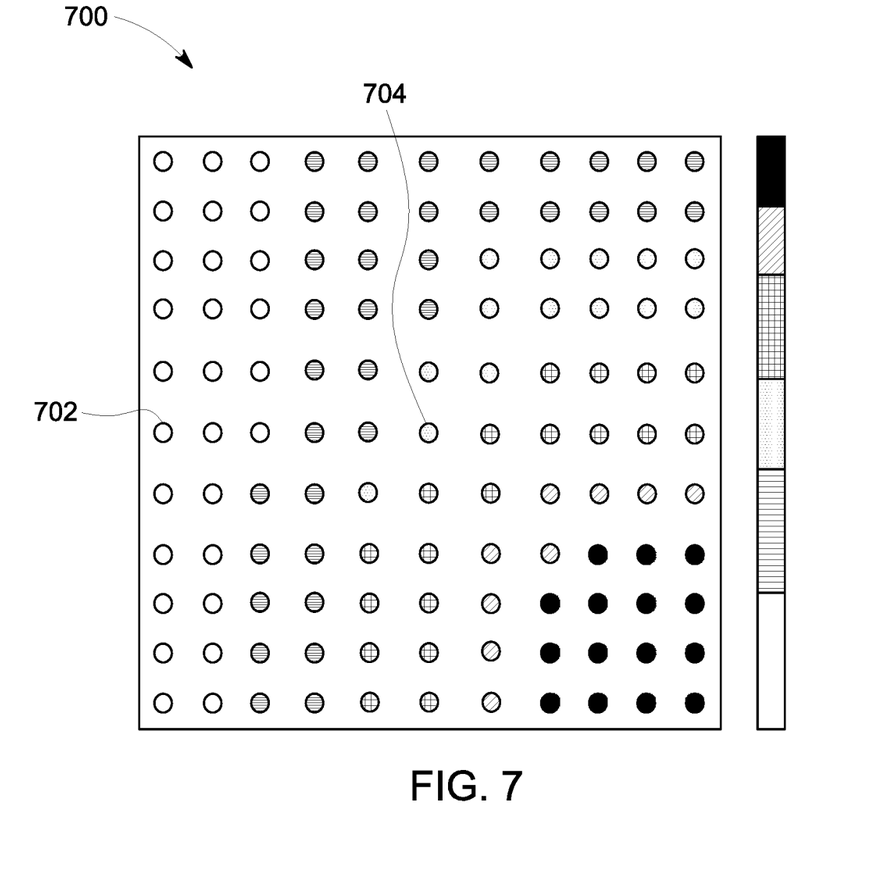
FIG. 7 is a schematic view of an exemplary surface profile generated by the coordinate measuring machine shown in FIG. 2.

During operation, calibration plate 11 is positioned within CMM 40, and the probe measures the geometry of surface 320 of calibration plate 11 and generates surface profile 700 and correction field 800. Correction field 800 is generated based on surface profile 700 and is sent to computing device 24 and/or controller 26. Calibration plate 11 is transferred from CMM 40 to DMLM system 10. Laser beam 16 and/or laser beams 16 and 17 write at least one fiducial mark on calibration plate 11, and calibration plate 11 is removed from DMLM system 10 and positioned in calibration system 42. Calibration system 42 then reads the fiducial mark on calibration plate 11, determines if laser beam 16 and/or laser beams 16 and 17 are aligned with each other and calibration plate 11, and sends the calibration data to computing device 24 and/or controller 26. Build platform 12 is then positioned within DMLM system 10, and a powdered material is spread on build platform 12. Laser device 14 transmits laser beam 16 and/or laser beams 16 and 17 towards the powdered build material on build platform 12 to consolidate the powdered build material into solid component 28.

Figure 4:
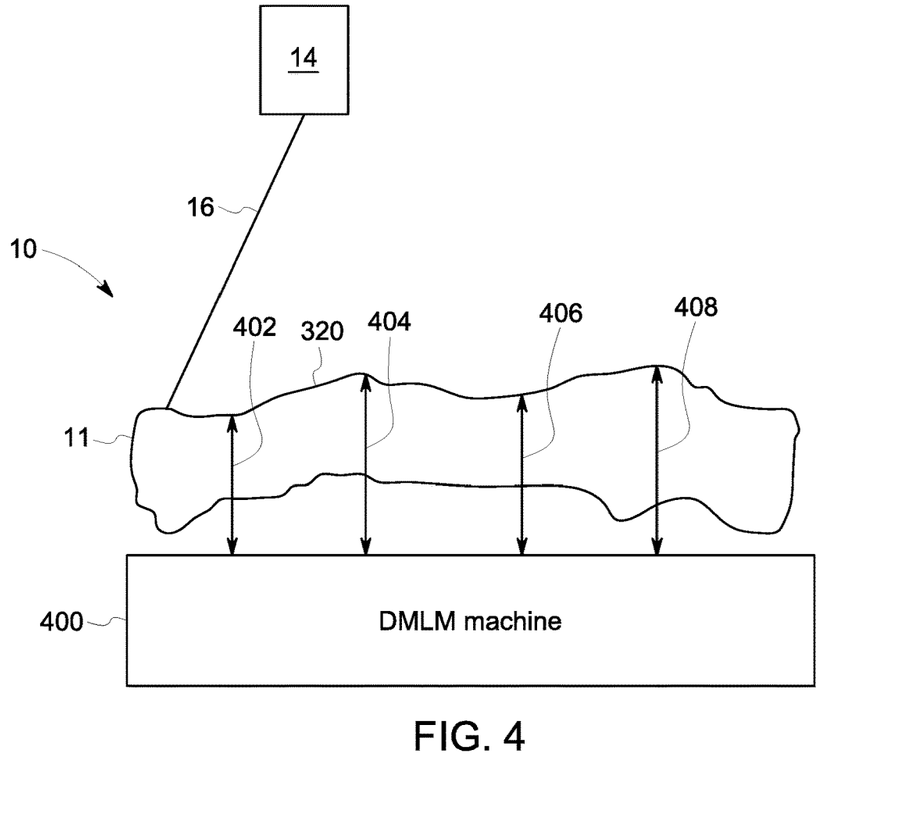
FIG. 4 is a schematic view of the calibration plate shown in FIG. 2 positioned in the additive manufacturing system shown in FIG. 2 in the first calibration configuration.

FIG. 3 is a schematic view of calibration plate 11 positioned in CMM 40 in a first calibration configuration. FIG. 4 is a schematic view of calibration plate 11 positioned in DMLM system 10 in the first calibration configuration. In the first calibration configuration, CMM 40 includes a first flat surface 300 (shown in FIG. 3), and DMLM system 10 includes a second flat surface 400 (shown in FIG. 4). As used herein, a flat surface is a surface with a total variance of less than 10 μm. Both first flat surface 300 and second flat surface 400 are substantially flat and substantially similar. More specifically, first flat surface 300 and second flat surface 400 are substantially similar such that measurements taken on surface 320 of calibration plate 11 in CMM 40 substantially correspond to measurements taken on surface 320 of calibration plate 11 in DMLM system 10.

For example, as shown in FIG. 3, a plurality of distances 302, 304, 306, and 308 are defined between first flat surface 300 and surface 320 of calibration plate 11 when calibration plate 11 is positioned in CMM 40. Similarly, as shown in FIG. 4, a plurality of distances 402, 404, 406, and 408 are defined between second flat surface 400 and surface 320 of calibration plate 11 when calibration plate 11 is positioned in DMLM system 10. Distance 302 substantially corresponds to distance 402, distance 304 substantially corresponds to distance 404, distance 306 substantially corresponds to distance 406, and distance 308 substantially corresponds to distance 408. First flat surface 300 and second flat surface 400 are substantially flat and correspond to each other such that distance 302 is substantially equal to distance 402, distance 304 is substantially equal to distance 404, distance 306 is substantially equal to distance 406, and distance 308 is substantially equal to distance 408. Accordingly, calibration plate 11 has substantially the same orientation in CMM 40 and DMLM system 10 in the first calibration configuration.

Figure 5:
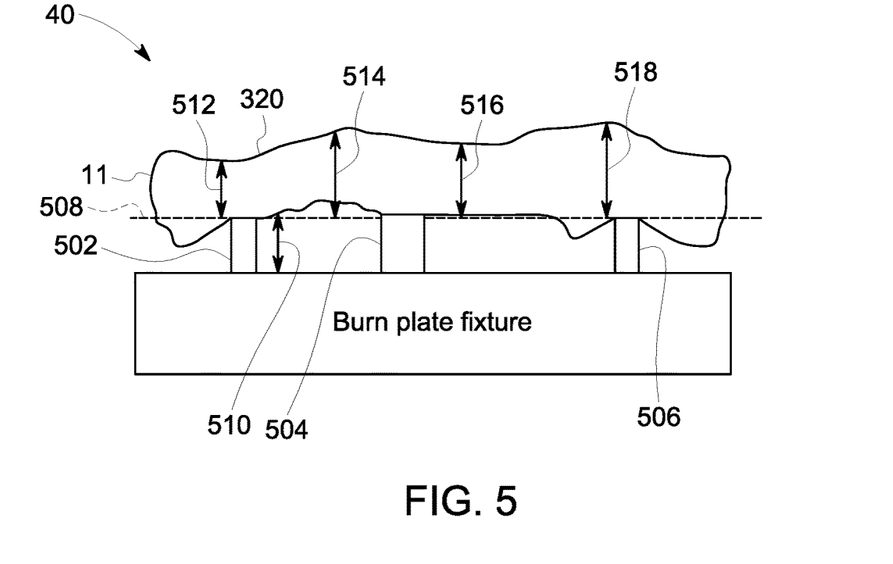
FIG. 5 is a schematic view of the calibration plate shown in FIG. 2 positioned in the coordinate measuring machine shown in FIG. 2 in the second calibration configuration.
Figure 6:
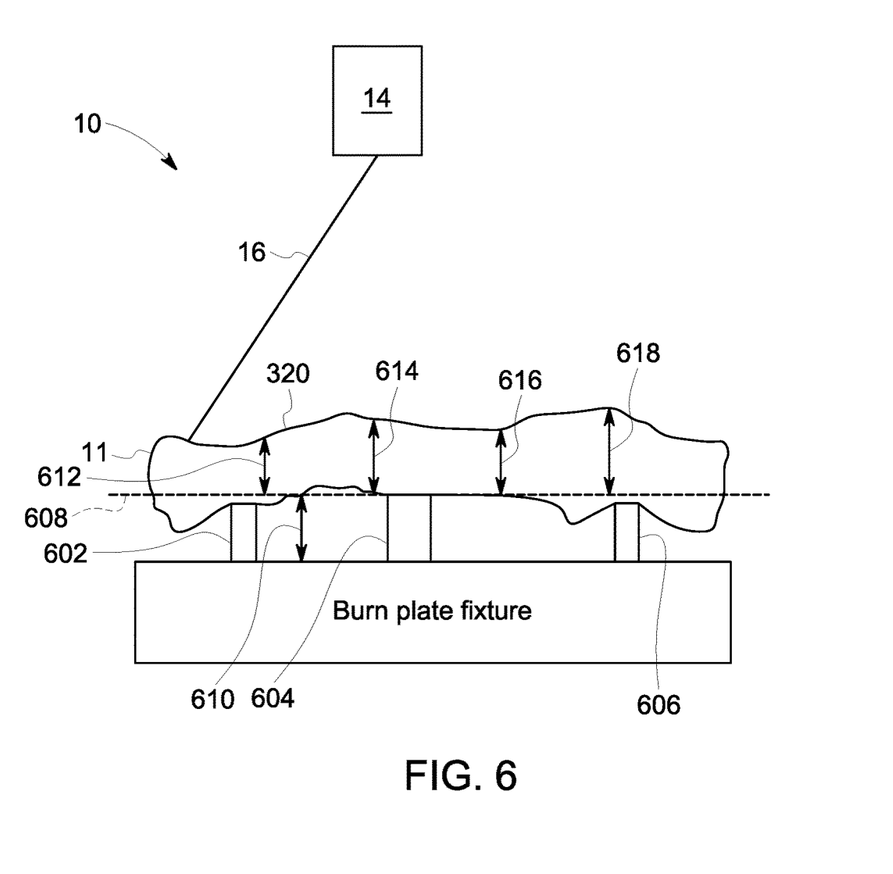
FIG. 6 is a schematic view of the calibration plate shown in FIG. 2 positioned in the additive manufacturing system shown in FIG. 2 in the second calibration configuration.

FIG. 5 is a schematic view of calibration plate 11 positioned in CMM 40 in a second calibration configuration. FIG. 6 is a schematic view of calibration plate 11 positioned in DMLM system 10 in the second calibration configuration. In the second calibration configuration, CMM 40 includes a plurality of pins 502, 504, and 506 (shown in FIG. 5), and DMLM system 10 includes a plurality of pins 602, 604, and 606 (shown in FIG. 6). In the exemplary embodiment, CMM 40 includes at least three pins 502, 504, and 506 such that pins 502, 504, and 506 define an average plane 508 within CMM 40. Each pin 502, 504, and 506 is individually adjustable such that pins 502, 504, and 506 are able to adjust a position of average plane 508. Similarly, DMLM system 10 includes at least three pins 602, 604, and 606 such that pins 602, 604, and 606 define an average plane 608 within DMLM system 10. Each pin 602, 604, and 606 is individually adjustable such that pins 602, 604, and 606 are able to adjust a position of average plane 608. Specifically, pins 502, 504, and 506 and pins 602, 604, and 606 are adjustable such that average plane 508 substantially corresponds to average plane 608.

More specifically, pin 502 substantially corresponds to pin 602, pin 504 substantially corresponds to pin 604, and pin 506 substantially corresponds to pin 606. Pins 502, 504, and 506 may each be individually adjusted such that pins 502, 504, and 506 each have a height 510. Height 510 of pins 502, 504, and 506 may be the same or different. Similarly, pins 602, 604, and 606 may each be individually adjusted such that pins 602, 604, and 606 each have a height 610. Height 610 of pins 602, 604, and 606 may be the same or different. Height 510 of pins 502, 504, and 506 and height 610 of pins 602, 604, and 606 are each adjusted such that average plane 508 substantially corresponds to average plane 608.

For example, as shown in FIG. 5, a plurality of distances 512, 514, 516, and 518 are defined between average plane 508 and surface 320 of calibration plate 11 when calibration plate 11 is positioned in CMM 40. Similarly, as shown in FIG. 6, a plurality of distances 612, 614, 616, and 618 are defined between average plane 608 and surface 320 of calibration plate 11 when calibration plate 11 is positioned in DMLM system 10. Distance 512 substantially corresponds to distance 612, distance 514 substantially corresponds to distance 614, distance 516 substantially corresponds to distance 616, and distance 518 substantially corresponds to distance 618. Average plane 508 and average plane 608 correspond to each other such that distance 512 is substantially equal to distance 612, distance 514 is substantially equal to distance 614, distance 516 is substantially equal to distance 616, and distance 518 is substantially equal to distance 618. Accordingly, calibration plate 11 has substantially the same orientation in CMM 40 and DMLM system 10 in the second calibration configuration.

FIG. 7 is a schematic view of a surface profile 700 of surface 320 of calibration plate 11 generated by CMM 40. As shown in FIG. 7, CMM 40 uses the probe (not shown) to measure surface 320 of calibration plate 11 at a plurality of measurement points 702 on surface 320 of calibration plate 11. Specifically, as shown in FIG. 7, measurement points 702 are arranged in a grid pattern on surface 320 of calibration plate 11. However, measurement points 702 may be arranged in any pattern on surface 320 of calibration plate 11 that enables CMM 40 and DMLM system 10 to operate as described herein. Measurement points 702 include at least one reference point 704. Reference point 704 is set to the value zero, and all other measurement points 702 are measured relative to reference point 704. Accordingly, the probe and CMM 40 measure each measurement point 702 and provide a calculated distance for each measurement point 702 relative to reference point 704. As shown in FIG. 7, the shading of each measurement point 702 indicates a relative calculated distance of each measurement point 702 from reference point 704. As such, surface profile 700 includes a profile of calculated distances of each measurement point 702 relative to reference point 704.

FIG. 8 is a schematic view of correction field 800 of surface 320 of calibration plate 11 generated by CMM 40. CMM 40, computing device 24, and/or controller 26 and/or generate correction field 800 based on surface profile 700. In the exemplary embodiment, CMM 40 generates correction field 800 based on surface profile 700. In alternative embodiments, CMM 40 sends surface profile 700 to computing device 24 and/or controller 26, and computing device 24 and/or controller 26 generates correction field 800 based on surface profile 700. Correction field 800 is generated by determining the distance for each measurement point 702 relative to reference point 704 by determining a correction factor for each measurement point 702. The correction factor is determined by projecting each measurement point 702 onto surface profile 700 of surface 320 of calibration plate 11. A line is defined through surface profile 700 and a position of laser device 14. An intersection of the line with a plane 902 (shown in FIGS. 9 and 10) of recoater 23 is computed to determine a compensated point which is the location at which laser beam 16 and/or laser beams 16 and 17 will intersect powdered build material 21 across build platform 12.

Figure 9:
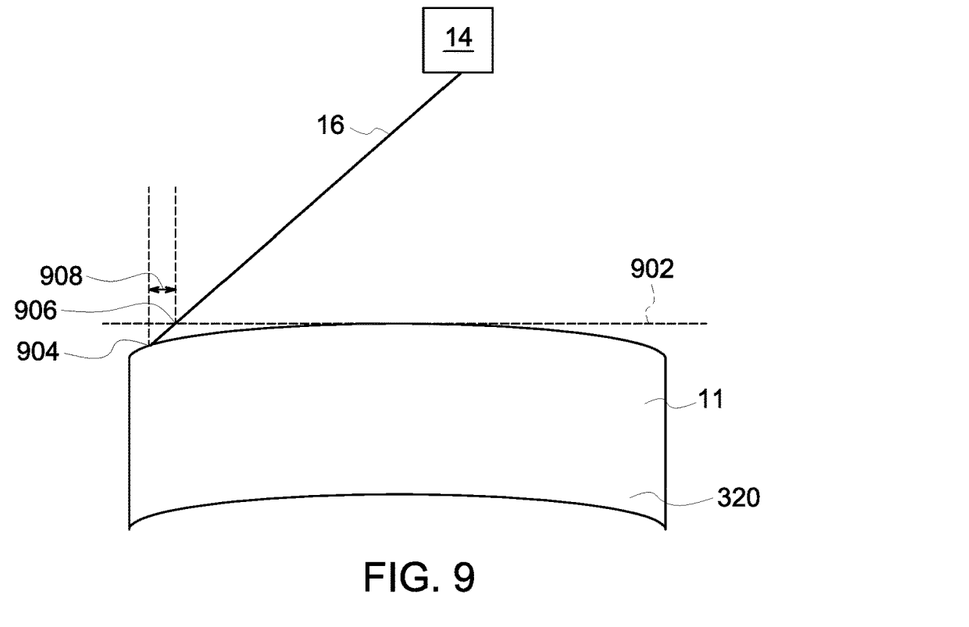
FIG. 9 is an additional schematic view of the calibration plate shown in FIG. 2 positioned in the additive manufacturing system shown in FIG. 2.
Figure 10:
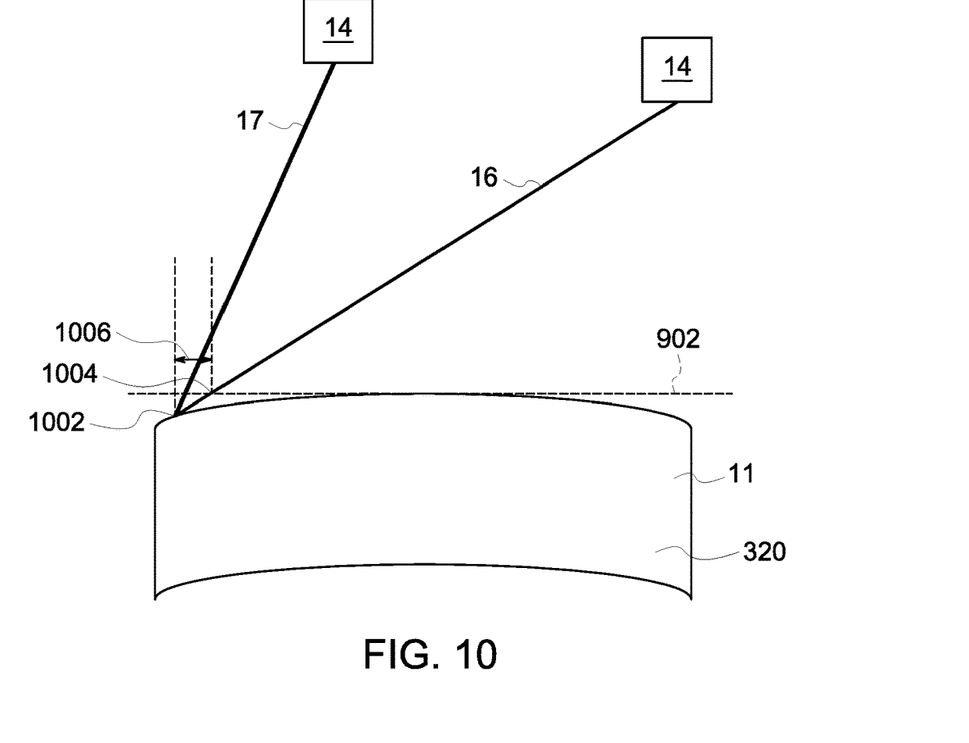
FIG. 10 is an additional schematic view of the calibration plate shown in FIG. 2 positioned in the additive manufacturing system shown in FIG. 2.

FIG. 9 is another schematic view of calibration plate 11 positioned in DMLM system 10. FIG. 10 is another schematic view of calibration plate 11 positioned in DMLM system 10. As shown in FIGS. 9 and 10, calibration plate 11 is placed in DMLM system 10 such that a portion of calibration plate 11 is aligned with a predetermined plane 902 of DMLM system 10. In the exemplary embodiment, predetermined plane 902 corresponds to a vertical position of powdered build material 21 within DMLM system 10 during the manufacturing process, or plane of recoater 23. As shown in FIG. 9, when calibration plate 11 is not entirely flat, first laser beam 16 intersects surface 320 of calibration plate 11 at a first point 904 and intersects plane 902 at a second point 906. The horizontal distance between first point 904 and second point 906 is a first error distance 908. As shown in FIG. 10, second laser beam 17 may not originate from the same point as first laser beam 16. As such, second laser beam 17 intersects surface 320 of calibration plate 11 at a first point 1002 and intersects plane 902 at a second point 1004. The horizontal distance between first point 1002 and second point 1004 is a second error distance 1006. Accordingly, both laser beams 16 and 17 may have a horizontal error when calibration plate 11 is not entirely flat. Additionally, laser beam 16 and/or laser beams 16 and 17 write at least one fiducial mark (not shown) on surface 320 of calibration plate 11. In the exemplary embodiment, laser beam 16 and/or laser beams 16 and 17 each write a plurality of fiducial marks (not shown) on surface 320 of calibration plate 11. Laser beam 16 and/or laser beams 16 and 17 may write any number of fiducial marks (not shown) on surface 320 of calibration plate 11 that enable DMLM system 10 to operate as described herein.

After the fiducial marks have been written on surface 320 of calibration plate 11, calibration plate 11 is transferred to calibration system 42. Calibration system 42 reads the fiducial marks on surface 320 of calibration plate 11 and generates calibration data which is sent to computing device 24 and/or controller 26. Computing device 24 and/or controller 26 align laser beam 16 and/or laser beams 16 and 17 based on the calibration data and correction field 800. Specifically, computing device 24 and/or controller 26 adjust a position of laser beam 16 and/or laser beams 16 and 17 based on the calibration data and correction field 800. More specifically, computing device 24 and/or controller 26 compare the position of the fiducial marks from the calibration data and correction field 800 to determine a corrected position for laser beam 16 and/or each laser beam 16 and 17. Accordingly, laser beam 16 and/or laser beams 16 and 17 are properly aligned before build platform 12 and powdered build material 21 are positioned in DMLM system 10. Accordingly, laser beam 16 and/or laser beams 16 and 17 may be accurately aligned without using an entirely flat calibration plate 11. One or more corrected positions are then used to create a correction field across the build plate that can be applied to the position of the laser beam(s) to correct flatness and parallelism errors across the build plate, resulting in a more accurate alignment of the two laser positions across their shared field.

Figure 11:
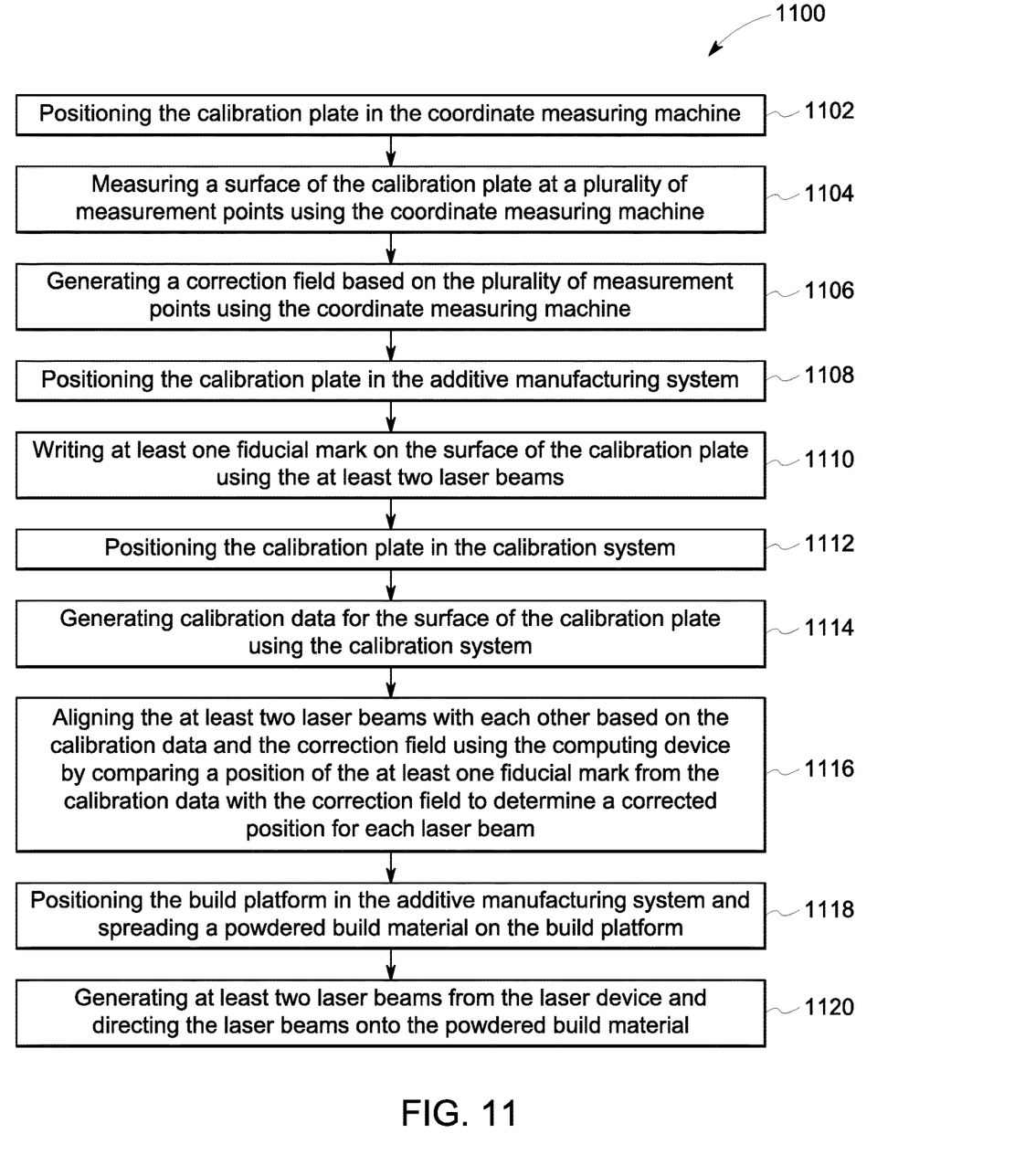
FIG. 11 is a flow diagram of a method of manufacturing a component using the additive manufacturing systems shown in FIGS. 1 and 2.

FIG. 11 is a flow diagram of a method 1100 of manufacturing component 28 with DMLM system 10. Method 1100 includes positioning 1102 the calibration plate in the coordinate measuring machine. Method 1100 also includes measuring 1104 a surface of the calibration plate at a plurality of measurement points using the coordinate measuring machine. Method 1100 further includes generating 1106 a correction field based on the plurality of measurement points using the coordinate measuring machine. Method 1100 also includes positioning 1108 the calibration plate in the additive manufacturing system. Method 1100 further includes writing 1110 at least one fiducial mark on the surface of the calibration plate using the at least one laser beam. Method 1100 also includes positioning 1112 the calibration plate in the calibration system. Method 1100 further includes generating 1114 calibration data for the surface of the calibration plate using the calibration system. Method 1100 also includes aligning 1116 the at least one laser beam within the additive manufacturing system based on the calibration data and the correction field using the computing device by comparing a position of the at least one fiducial mark from the calibration data with the correction field to determine a corrected position for the at least one laser beam. Method 1100 further includes positioning 1118 the build platform in the additive manufacturing system and spreading a powdered build material on the build platform. Method 1100 also includes generating 1120 at least one laser beam from the laser device and directing the laser beam onto the powdered build material.

Embodiments of additive manufacturing systems described herein align multiple lasers using a calibration plate. Specifically, the additive manufacturing system includes a calibration plate, at least one laser device generating at least one laser beam, and a coordinate measuring machine (CMM). The CMM includes a probe configured to measure the geometry of the calibration plate by measuring a plurality of measuring points on a surface of the calibration plate. The calibration plate is placed on a CMM calibration surface that corresponds to an additive manufacturing system calibration surface in the additive manufacturing system. As such, the measurements taken by the CMM correspond to a predetermined plane within the additive manufacturing system. In the exemplary embodiment, the predetermined plane is aligned with the position of a powder material within the additive manufacturing system during the manufacturing process. The calibration plate is positioned within the CMM, and the probe measures the geometry of the calibration plate and generates a surface profile and a correction field for the calibration plate. The correction field is sent to a computing device that controls the at least one laser device, and the calibration plate is placed in the additive manufacturing system. The laser beam of the at least one laser device write at least one fiducial mark on the calibration plate, and the calibration plate is subsequently removed from the additive manufacturing system and positioned in a calibration system. The calibration system then reads the fiducial marks on the calibration plate to determine if the laser beam is aligned within the additive manufacturing system and the calibration plate, and sends the calibration data to the computing device. A build platform is then positioned within the additive manufacturing system, and a powdered material is spread on the build platform. The at least one laser device generates the laser beam directed towards the powdered build material on the build platform to consolidate the powdered build material into a solid component.

The surface of the calibration plate may include irregularities which may cause the laser beam to be uncalibrated. For example, irregularities in a vertical direction may cause misalignment in a horizontal direction. More specifically, if the calibration plate is not entirely flat, the irregularities in the vertical direction may cause a laser beam spot to be directed to a point which is offset from an intended point on the calibration plate. The computing device controls the at least one laser device based on the calibration data and the correction field such that the laser beam is aligned on the calibration plate and the build platform. More specifically, the computing device controls the at least one laser device such that horizontal positions of the laser beam is compensated to account for irregularities in the calibration plate. Accordingly, the calibration plate does not have to be entirely flat, reducing the cost of the calibration plate. Further, the computer device can account for any misalignments between the calibration plate and the build plate within the additive manufacturing system.

An exemplary technical effect of the methods and systems described herein includes: (a) aligning multiple laser beams within an additive manufacturing system; (b) detecting irregularities in a calibration plate within an additive manufacturing system; and (c) reducing defects in a component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of calibrating an additive manufacturing machine, the method comprising:
    positioning a calibration plate in a coordinate measuring machine;
    optically or mechanically measuring a surface of the calibration plate at a plurality of measurement points while the calibration plate is in the coordinate measuring machine to generate a surface profile of the surface of the calibration plate;
    generating a correction field based at least in part on a line projected through respective ones of the plurality of measurement points and determining an intersection point of the line with a reference plane corresponding to a vertical position of a powdered build material in the additive manufacturing machine, the line representing a laser beam intersecting with the powdered build material;
    transferring the calibration plate from the coordinate measuring machine to the additive manufacturing machine, the additive manufacturing machine comprising a laser device;
    writing at least one fiducial mark on the surface of the calibration plate using at least one laser beam generated by the laser device;
    transferring the calibration plate from the additive manufacturing machine to a calibration system;
    detecting a position of the at least one fiducial mark on the surface of the calibration plate while the calibration plate is in the calibration system;
    generating calibration data corresponding to the surface of the calibration plate based on the position the at least one fiducial mark;
    computing a corrected position for the at least one laser beam based at least in part on a comparison of the correction field to the position of the at least one fiducial mark; and
    aligning the at least one laser beam based at least in part on the corrected position.

2. The method of claim 1, wherein measuring the surface of the calibration plate comprises:
    mechanically contacting the plurality of measurement points on the surface of the calibration plate to measure the surface of the calibration plate.

3. The method of claim 1, comprising:
    measuring a reference point on the surface of the calibration plate, wherein generating the surface profile comprises measuring the plurality of measurement points relative to the reference point.

4. The method of claim 1, wherein generating the correction field comprises:
    calculating a distance between a reference point and respective ones of the plurality of measurement points; and
    determining a correction factor for respective ones of the plurality of measurement points based at least in part on the distance between the reference point and respective ones of the plurality of measurement points.

5. The method of claim 4, comprising:
    aligning the at least one laser beam based at least in part on the correction factor for respective ones of the plurality of measurement points.

6. The method of claim 1, wherein the plurality of measurement points are arranged in a grid pattern on the surface of the calibration plate.

7. The method of claim 1, wherein detecting the position of the at least one fiducial mark comprises optically reading the at least one fiducial mark on the surface of the calibration plate.

8. The method of claim 1, wherein writing at least one fiducial mark comprises writing a plurality of fiducial marks on the surface of the calibration plate.

9. The method of claim 1, wherein positioning the calibration plate in the coordinate measuring machine comprises:
positioning the calibration plate on a first flat surface of the coordinate measuring machine.

10. The method of claim 9, wherein positioning the calibration plate in the additive manufacturing machine comprises:
positioning the calibration plate on a second flat surface of the additive manufacturing machine.

11. The method of claim 1, wherein positioning the calibration plate in the coordinate measuring machine comprises:
positioning the calibration plate on at least three first pins defining a part of the coordinate measuring machine, the at least three first pins configured to interface with the calibration plate.

12. The method of claim 11, wherein positioning the calibration plate in the additive manufacturing machine comprises:
positioning the calibration plate on at least three second pins defining a part of the additive manufacturing machine, the at least three second pins configured to interface with the calibration plate.

13. A method of additively manufacturing a three-dimensional component, the method comprising:
positioning a calibration plate in a coordinate measuring machine;
optically or mechanically measuring a surface of the calibration plate at a plurality of measurement points while the calibration plate is in the coordinate measuring machine to generate a surface profile of the surface of the calibration plate;
generating a correction field based at least in part on a line projected through respective ones of the plurality of measurement points and determining an intersection point of the line with a reference plane corresponding to a vertical position of a powdered build material in the additive manufacturing machine, the line representing a laser beam intersecting with the powdered build material;
transferring the calibration plate from the coordinate measuring machine to an additive manufacturing machine, the additive manufacturing machine comprising a laser device;
writing at least one fiducial mark on the surface of the calibration plate using at least one laser beam generated by the laser device;
transferring the calibration plate from the additive manufacturing machine to a calibration system;
detecting a position of the at least one fiducial mark on the surface of the calibration plate while the calibration plate is in the calibration system;
generating calibration data corresponding to the surface of the calibration plate;
computing a corrected position for the at least one laser beam based at least in part on a comparison of the position of the correction field to the at least one fiducial mark;
aligning the at least one laser beam based at least in part on the corrected position;
positioning a build plate in the additive manufacturing machine and spreading a powdered build material on the build plate; and
generating at least one laser beam from the laser device and directing the at least one laser beam onto the powdered build material.

14. The method of claim 13, wherein the measuring the surface of the calibration plate comprises:
mechanically contacting the plurality of measurement points on the surface of the calibration plate to measure the surface of the calibration plate.

* * * * *